(12) United States Patent
Schafer et al.

(10) Patent No.: US 9,508,157 B2
(45) Date of Patent: Nov. 29, 2016

(54) RECONSTRUCTION OF ANEURYSM WALL MOTION

(71) Applicant: Siemens Medical Solutions USA, Inc., Malvern, PA (US)

(72) Inventors: Sebastian Schafer, Madison, WI (US); Kevin Royalty, Fitchburg, WI (US); Gunter Lauritsch, Nuremberg (DE)

(73) Assignees: Siemens Medical Solutions USA, Inc., Malvern, PA (US); Siemens Healthcare GmbH, Erlangen (DE)

( * ) Notice: Subject to any disclaimer, the term of this patent is extended or adjusted under 35 U.S.C. 154(b) by 84 days.

(21) Appl. No.: 14/568,815

(22) Filed: Dec. 12, 2014

(65) Prior Publication Data
US 2016/0171716 A1    Jun. 16, 2016

(51) Int. Cl.
G06T 7/20 (2006.01)
G06T 7/00 (2006.01)

(52) U.S. Cl.
CPC .......... G06T 7/2086 (2013.01); G06T 7/0012 (2013.01); G06T 2207/10021 (2013.01); G06T 2207/30101 (2013.01)

(58) Field of Classification Search
CPC ..... G06T 7/0012; G06T 7/20; G06T 7/2086; G06T 2207/10076; G06T 2207/10121; G06T 2207/30101; G06K 2209/05; G06K 2209/051; G06K 2209/053; A61B 5/7285; A61B 5/7289; A61B 5/7292; A61B 6/5288; A61B 6/5294
See application file for complete search history.

(56) References Cited

U.S. PATENT DOCUMENTS

| | | | |
|---|---|---|---|
| 5,710,875 A | 1/1998 | Harashima et al. | 345/419 |
| 6,070,097 A | 5/2000 | Kreger et al. | 600/521 |
| 7,415,093 B2 | 8/2008 | Tkaczyk et al. | 378/8 |
| 7,500,784 B2 | 3/2009 | Grebner et al. | |
| 7,948,503 B2 | 5/2011 | Shekhar et al. | 345/648 |
| 7,986,822 B2 | 7/2011 | Hall | 382/128 |
| 8,704,825 B2 | 4/2014 | Holub et al. | 345/419 |
| 2001/0003792 A1* | 6/2001 | Ogura et al. | 600/500 |
| 2006/0074292 A1 | 4/2006 | Thomson et al. | 600/411 |
| 2006/0120507 A1 | 6/2006 | Brunner et al. | 378/62 |
| 2006/0133564 A1 | 6/2006 | Langan et al. | 378/8 |

(Continued)

FOREIGN PATENT DOCUMENTS

EP    2242023 A1    10/2010

OTHER PUBLICATIONS

C. Rohkohl, et al., "Interventional 4D motion estimation and reconstruction of cardiac vasculature without motion periodicity assumption", Medical Image Analysis 14 (2010) 687-695.

(Continued)

Primary Examiner — Andrew W Johns (57) ABSTRACT

A framework for image-based reconstruction is provided herein. In accordance with one aspect, the framework receives three-dimensional projection image data of an aneurysm wall in a vascular structure of interest and electrocardiogram signal data, wherein the three-dimensional projection image data is correlated to phases of the electrocardiogram signal data. The framework may sort the three-dimensional projection image data into phase-binned image data according to the phases, and reconstruct three-dimensional layouts of the aneurysm wall in the vascular structure of interest using the phased-binned image data. The framework may then determine the motion of the aneurysm wall between the phases based on the reconstructed three-dimensional layouts.

14 Claims, 7 Drawing Sheets

(56) References Cited

U.S. PATENT DOCUMENTS

| | | | |
|---|---|---|---|
| 2009/0263001 A1 | 10/2009 | Ding et al. | 382/131 |
| 2009/0292818 A1 | 11/2009 | Blount et al. | 709/231 |
| 2010/0020926 A1 | 1/2010 | Boese et al. | 378/44 |
| 2010/0278405 A1 | 11/2010 | Kakadiaris et al. | 382/131 |
| 2011/0298793 A1 | 12/2011 | Lauritsch et al. | 345/419 |
| 2012/0170822 A1 | 7/2012 | Litvin et al. | 382/131 |
| 2013/0070994 A1* | 3/2013 | Liang et al. | G06T 7/0012 382/131 |
| 2014/0094680 A1 | 4/2014 | Kowarschik et al. | A61B 5/026 |
| 2014/0119611 A1* | 5/2014 | Prevrhal et al. | G06T 11/005 382/107 |

OTHER PUBLICATIONS

C. Rohkohl, et al., "ECG-Gated Interventional Cardiac Reconstruction for Non-periodic Motion", Medical Image Computing and Computer-Assisted Intervention, MICCAI 2010, Beijing, China, Sep. 2010, Lecture Notes in Computer Science 6361, Springer, 2010, 151-158.

C. Shwemmer, et al., "Residual Motion Compensation in ECG-gated interventional cardiac vasculature reconstruction", Phys. Med. Biol. 58 (2013) 3717-3737.

Chris Schwemmer, et al., "Opening Windows—Increasing Window Size in Motion-Compensated ECG-gated Cardiac Vasculature Reconstruction", Proceedings of the International Conference of Fully Three-Dimensional Image Reconstruction in Radiology and Nuclear Medicine, Jun. 16-21, 2013, Granlibakken Resort, Lake Tahoe, California, USA, pp. 51-54.

Wolfgang Holub, et al., "4-D Motion Animation of Coronary Arteries from Rotational Angiography", Proceedings of SPIE 7964 (2011) 1S1-10.

Schafer, D.; Borgert, J.; Rasche, V.; Grass, M., "Motion-compensated and gated cone beam filtered back-projection for 3-D rotational X-ray angiography," Medical Imaging, IEEE Transactions on , vol. 25, No. 7, pp. 898,906, Jul. 2006.

Hansis, E.; Schafer, D.; Dossel, O.; Grass, M., "Evaluation of Iterative Sparse Object Reconstruction From Few Projections for 3-D Rotational Coronary Angiography," Medical Imaging, IEEE Transactions on , vol. 27, No. 11, pp. 1548,1555, Nov. 2008.

Blondel C.; Malandain, G.; Vaillant, R.; Ayache, N., "Reconstruction of coronary arteries from a single rotational X-ray projection sequence," Medical Imaging, IEEE Transactions on , vol. 25, No. 5, pp. 653,663, May 2006.

E. Hansis, et al., "Four-dimensional cardiac reconstruction from rotational x-ray sequences: first results for 4D coronary angiography", E. Samei and J. Hsieh, Eds., vol. 7258, No. 1. Lake Buena Vista, FL, USA: SPIE, Mar. 2009, p. 72580B.

E. Hansis, et al., "Projection-based motion compensation for gated coronary artery reconstruction from rotational x-ray angiograms", Physics in Medicine and Biology vol. 53, No. 14, pp. 3807-3820, Jul. 2008.

Rohkohl, C.; Lauritsch, Gunter; Noting, Alois; Prummer, M.; Hornegger, Joachim, "C-arm CT: Reconstruction of dynamic high contrast objects applied to the coronary sinus," Nuclear Science Symposium Conference Record, 2008. NSS '08. IEEE , vol., No., pp. 5113,5120, Oct. 19-25, 2008.

High-quality 3-D coronary artery imaging on an interventional C-arm x-ray systemHansis, Eberhard and Carroll, John D. and Schäfer, Dirk and Dössel, Olaf and Grass, Michael, Medical Physics, 37, 1601-1609 (2010), DOI:http://dx.doi.org/10.1118/1.3352869.

Christopher Rohkohl, et al., "General 4-D Motion Estimation using Dynamic Reconstruction algorithms", Date and source unknown.

Davis, B., et al. "4d digital subtraction angiography: Implementation and demonstration of feasibility." American Journal of Neuroradiology 34.10 (2013): 1914-1921.

Zagrodsky et al., "Multi-function extenison of simplex optimization method for mutual information based registration of ultrasound volumes", in Proc. SPIE, vol. 4322, Medical Imaging, Feb. 17, 2001, pp. 508-515.

Shekhar et al., "Mutual Information-Based Rigid and Nonrigid Registration of Ultrasound Volumes", Jan. 2002, IEEE Transactions on Medical Imaging, vol. 21, No. 1, pp. 9-22.

Rohling et al., "Automatic registration of 3-D ultrasound images", Jan. 4-7, 1998, Sixth International Conference on Computer Vision, pp. 298-303.

Scherl, et al., Fast GPU-BAsed CT Reconstruction using the Common Unified Device Architecture (CUDA), In: Frey, Eric C (Eds) Nuclear Science Symposium, Medical Imaging Conference 2007 (2007 Nuclear Science Symposium, Medical Imaging Conference Honolulu, Hawaii (USA) 30.10.-3.11.2007) vol. 6 2007, pp. 4464-4466-ISBN 978-1-4244-0922-8.

Dirk Schafer et al., "Three-dimensional reconstruction of coronary stents in vivo based on motion compensated X-ray angiography", Proc. SPIE 6509, 65091M (2007).

* cited by examiner

RECONSTRUCTION OF ANEURYSM WALL MOTION

TECHNICAL FIELD

The present disclosure generally relates to image data processing, and more particularly to reconstruction of aneurysm wall motion.

BACKGROUND

An aneurysm is a localized, blood-filled dilation or bulge of a blood vessel caused by disease or weakening of the vessel wall. Aneurysms can occur anywhere where there are blood vessels, although they are most common in arteries. Aneurysms most commonly occur in arteries at the base of the brain, in the circle of Willis and in the aorta. Rupture and blood clotting are the risks involved with aneurysms. Particularly if the patient has elevated blood pressure, this bulge in the blood vessel can burst and lead to hemorrhage and possibly death at any time. The risk of death is high except for rupture in the extremities. The larger an aneurysm becomes, the more likely it is to burst.

X-ray C-arms are routinely used in medicine to acquire images for diagnostic assessment of a patient's vascular structures, and for guidance of interventional therapeutic procedures such as stent placement or coiling of aneurysms. Cerebral aneurysms are usually treated with stents, wire coils or glue, with the intention to form a blood clot in the aneurysm that relieves the pressure against the aneurysm's wall.

Diagnostic applications include the acquisition of angiograms, 2D X-ray projection images of vascular structures filled with a contrast agent injected through a catheter. For an improved representation of the vessels under examination, Digital Subtraction Angiography (DSA) has been developed. DSA is fluoroscopy technique used in interventional radiology to clearly visualize blood vessels in a bony or dense soft tissue environment. Images are produced by subtracting a 'pre-contrast image' or the mask from subsequent images acquired after the contrast medium has been introduced into a structure or tissue of interest. These images can be used to provide time-resolved or time-varying information that shows the development of the structure or tissue of interest over time.

Identifying physical properties of an aneurysm, such as the thickness, rigidity and pliability of the vessel wall, can yield additional information for assessing the risk of the aneurysm, monitoring and treatment thereof. Physical properties derived by most prior work are static, and fail to take into account temporal changes that occur during a cardiac cycle. Currently, there is very little work known to be capable of providing three-dimensional (3D) reconstruction and representation of dynamic aneurysm wall motion.

SUMMARY

Described herein is a framework for image-based reconstruction. In accordance with one aspect, the framework receives three-dimensional projection image data of an aneurysm wall in a vascular structure of interest and electrocardiogram signal data, wherein the three-dimensional projection image data is correlated to phases of the electrocardiogram signal data. The framework may sort the three-dimensional projection image data into phase-binned image data according to the phases, and reconstruct three-dimensional layouts of the aneurysm wall in the vascular structure of interest using the phased-binned image data. The framework may then determine the motion of the aneurysm wall between the phases based on the reconstructed three-dimensional layouts.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

The term "X-ray image" as used herein may mean a visible X-ray image (e.g., displayed on a video screen) or a digital representation of an X-ray image (e.g., a file corresponding to the pixel output of an X-ray detector). The term "in-treatment X-ray image" as used herein may refer to images captured at any point in time during a treatment delivery phase of an interventional or therapeutic procedure, which may include times when the radiation source is either on or off. From time to time, for convenience of description, CT imaging data (e.g., cone-beam CT imaging data) may be used herein as an exemplary imaging modality. It will be appreciated, however, that data from any type of imaging modality including but not limited to X-ray radiographs, MRI, PET (positron emission tomography), PET-CT, SPECT, SPECT-CT, MR-PET, 3D ultrasound images or the like may also be used in various implementations.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

As used herein, the term "image" refers to multi-dimensional data composed of discrete image elements (e.g., pixels for 2D images and voxels for 3D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, or a mapping to $R^3$, the present methods are not limited to such images, and can be applied to images of any dimension, e.g., a 2D picture or a 3D volume. For a 2- or 3-Dimensional image, the domain of the image is typically a 2- or 3-Dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The terms "pixels" for picture elements, conventionally used with respect to 2D imaging and image display, and "voxels" for volume image elements, often used with respect to 3D imaging, can be used interchangeably. It should be noted that the 3D volume image is itself synthesized from image data obtained as pixels on a 2D sensor array and displays as a 2D image from some angle of view. Thus, 2D image processing and image analysis techniques can be applied to the 3D volume image data. In the description that follows, techniques described as operating upon pixels may alternately be described as operating upon the 3D voxel data that is stored and represented in the form of 2D pixel data for display. In the same way, techniques that operate upon voxel data can also be described as operating upon pixels. In the following description, the variable x is used to indicate a subject image element at a particular spatial location or, alternately considered, a subject pixel. The terms "subject pixel" or "subject voxel" are used to indicate a particular image element as it is operated upon using techniques described herein.

One aspect of the present framework reconstructs a three-dimensional (3D) representation of aneurysm motion from rotational DSA projection images. During an endovascular intervention, the surgeon may place the injection catheter at the entry of the vascular structure of interest. An image acquisition may be performed with constant contrast filling of the aneurysm and electrocardiogram (ECG) monitoring of the patient. Each projection image acquired of the aneurysm may therefore be correlated to a specific heart phase. The framework may then distribute the projection images into respective heart phases (i.e., phase-binning). Using this phase-binned image data, the 3D layout of the vascular structure of interest at each phase step may be determined. Finally, the motion of the aneurysm in between these heart phases may be determined and pertinent metrics may be derived.

The reconstructed aneurysm motion enables greater understanding in the changes that occur during a cardiac cycle. For example, wall regions of high stress, deformation and mobility may be identified. Risks of rupture may then be more accurately assessed. Precise dynamic boundary conditions may also be provided for computational fluid dynamics (CFD) simulations. These and other exemplary advantages and features will be described in more detail in the following description.

Figure 1:
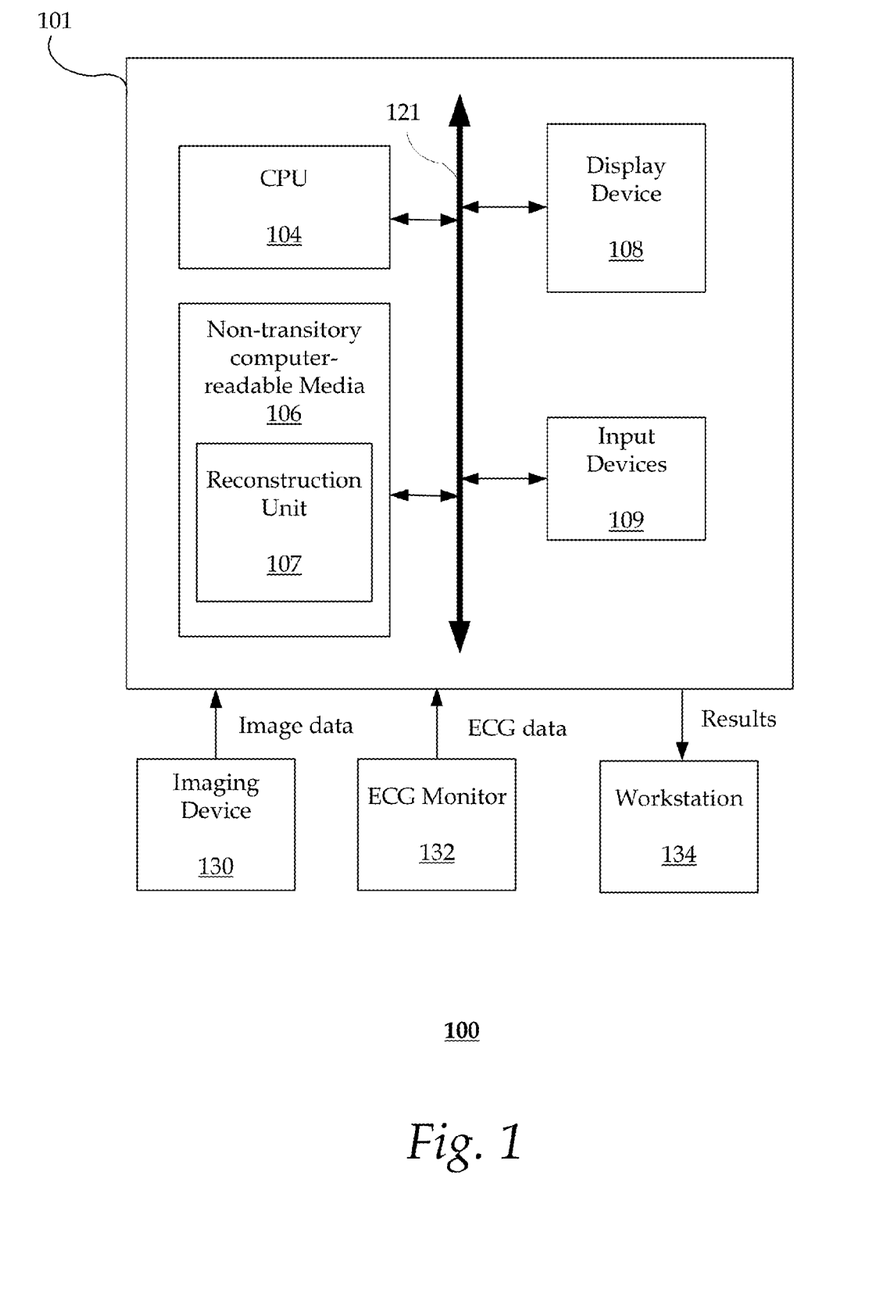
FIG. 1 is a block diagram illustrating an exemplary system.

FIG. 1 is a block diagram illustrating an exemplary system 100. The system 100 includes a computer system 101 for implementing the framework as described herein. Computer system 101 may be a desktop personal computer, a portable laptop computer, another portable device, a mini-computer, a mainframe computer, a server, a storage system, a dedicated digital appliance, a communication device, or another device having a storage sub-system configured to store a collection of digital data items. In some implementations, computer system 101 operates as a standalone device. In other implementations, computer system 101 may be connected (e.g., using a network) to other machines, such as imaging device 130, an electrocardiography (ECG) monitor 132 and workstation 134. In a networked deployment, computer system 101 may operate in the capacity of a server (e.g., thin-client server, such as Syngo® by Siemens Healthcare), a client user machine in server-client user network environment, or as a peer machine in a peer-to-peer (or distributed) network environment.

In one implementation, computer system 101 comprises a processor device or central processing unit (CPU) 104 coupled to one or more non-transitory computer-readable media 106 (e.g., computer storage or memory device), display device 108 (e.g., monitor) and various input devices 109 (e.g., mouse, touchpad or keyboard) via an input-output interface 121. Computer system 101 may further include support circuits such as a cache, a power supply, clock circuits and a communications bus. Various other peripheral devices, such as additional data storage devices and printing devices, may also be connected to the computer system 101.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in non-transitory computer-readable media 106. In particular, the present techniques may be implemented by a reconstruction unit 107. Non-transitory computer-readable media 106 may include random access memory (RAM), read-only memory (ROM), magnetic floppy disk, flash memory, and other types of memories, or a combination thereof. The computer-readable program code is executed by CPU 104 to process data acquired by, for example, imaging device 130 and ECG monitor 132. As such, the computer system 101 is a general-purpose computer system that becomes a specific-purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 106 may be used for storing image datasets, dynamic reconstruction instructions, knowledge base, individual patient data, database of previously treated patients (e.g., training data), and so forth. Such data may also be stored in external storage or other memories. The external storage may be implemented using a database management system (DBMS) managed by the CPU 104 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

The imaging device 130 may be a radiology scanner, such as an X-ray or a CT scanner, for acquiring image data. The imaging device 130 may be, for example, a flat-panel based X-ray scanner that includes at least one pair of X-ray source and X-ray detector. Alternatively, the imaging device 130 may include a rotating CT gantry covering at least one pair of X-ray source and X-ray detector. In other implementations, the imaging device 130 is an MR projection scanner. In yet other implementations, the imaging device 130 is a rotating optical CT gantry covering at least one pair of light source and optical detector. Other types of imaging device 130, such as angular sampling ultrasound, may also be used.

The ECG monitor 132 records electrical activity of the patient's heart (i.e., electrocardiogram or ECG). The electrical activity may be noninvasively detected by electrodes attached to the surface of the patient's skin. It is also possible to record ECGs invasively using an implantable loop recorder. The ECG monitor 132 may be, for example, a 3-lead, 5-lead, or 12-lead ECG, depending on the number of leads to be recorded.

The workstation 134 may include a computer and appropriate peripherals, such as a keyboard and display device, and can be operated in conjunction with the entire system 100. For example, the workstation 134 may communicate with the imaging device 130 so that the image data collected by the imaging device 130 can be rendered at the workstation 134 and viewed on a display device. The workstation 134 may communicate directly with the computer system 101 to display processed image data and/or output image processing results. The workstation 134 may include a graphical user interface to receive user input via an input device (e.g., keyboard, mouse, touch screen voice or video recognition interface, etc.) to manipulate visualization and/or processing of the image data.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 2:
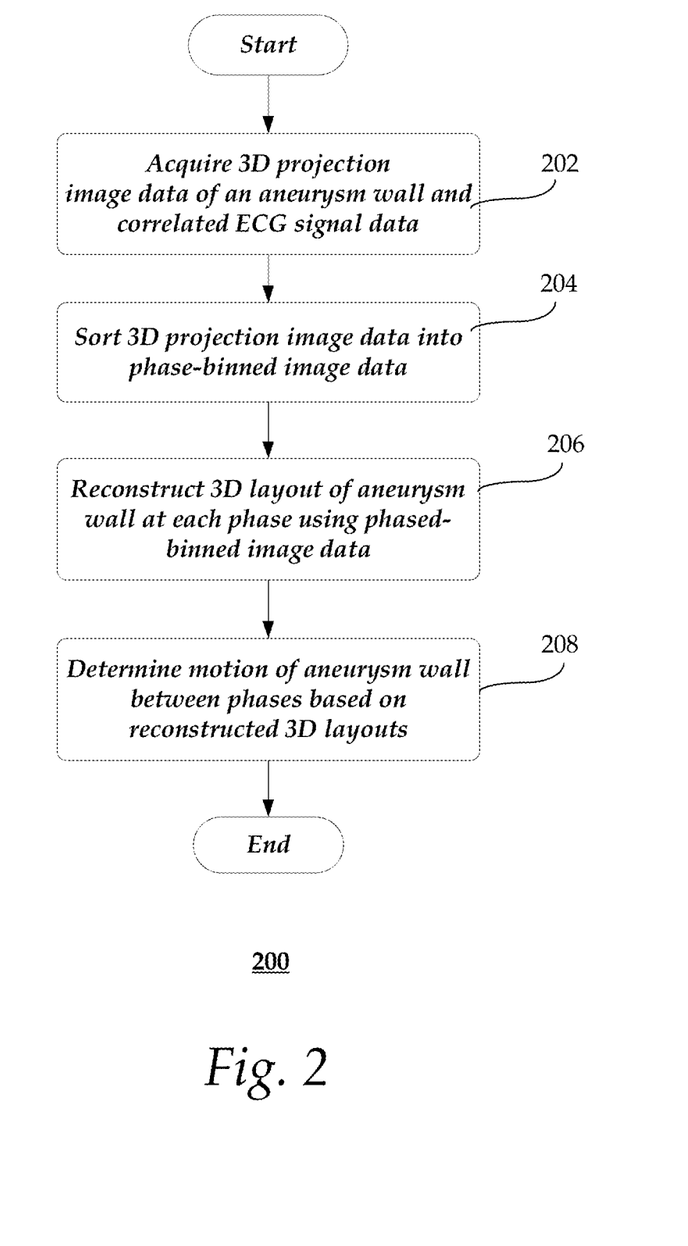
FIG. 2 shows an exemplary method of data reconstruction performed by a computer system.

FIG. 2 shows an exemplary method 200 of data reconstruction performed by a computer system. It should be understood that the steps of the method 200 may be performed in the order shown or a different order. Additional, different, or fewer steps may also be provided. Further, the method 200 may be implemented with the system 100 of FIG. 1, a different system, or a combination thereof.

At 202, imaging device 130 acquires 3D projection image data of an aneurysm wall (or aneurysm) and ECG monitor 132 acquires correlated ECG signal data. The aneurysm is located in a vascular structure of interest (e.g., artery, vessel, vascular tree or network, etc.) identified for further investigation or examination, and can be filled with a contrast agent or medium for observing its propagation over time. The vascular structure of interest may be found in, for example, a patient's or subject's brain, heart, leg, arm, and so forth. For example, the vascular structure of interest may be a cerebral vascular structure containing a cerebral aneurysm.

The 3D projection image data is correlated to heart phases of the ECG signal. More particularly, each projection image may be temporally correlated to a specific cardiac phase. Both the 3D image data and ECG signal data acquisitions may occur simultaneously during an endovascular intervention performed on a patient. For example, the surgeon places the injection catheter at the entry of the target vascular structure of interest containing an aneurysm in the patient for injecting a contrast medium, while the electrodes of the ECG monitor 132 are attached to the patient (e.g., limbs). In some implementations, the imaging device 130 performs an X-ray delayed 3D Digital Subtraction Angiography (DSA) or mask-and-fill image acquisition with constant contrast filling of the aneurysm and correlated ECG monitoring of the patient by the ECG monitor 132. Each projection image acquired of the aneurysm is therefore correlated to a specific heart phase.

To perform the 3D DSA image acquisition, the imaging device 130 may first acquire a mask image dataset prior to the injection, such that it can be subtracted from the corresponding time-varying contrast-filled projection image dataset. A mask image is an image of the same area or volume before the contrast agent (or medium) is administered to fill the irradiated vascular structure of interest that is to be investigated. A plurality of mask images corresponding to multiple projection directions may be acquired. Angular- and time-varying contrast image data may be acquired by a contrast-enhanced fill scan that is initiated at the time of, or a few seconds after, the injection of the contrast medium into the structure of interest as the first inflow of contrast becomes visible. The contrast image data may also include a plurality of contrast images corresponding to multiple projection directions. The multiple projection directions to which the contrast image data correspond may coincide with the multiple projection directions to which the plurality of mask images correspond. Injection of the contrast medium may continue for the remainder of the 3D DSA acquisition. 3D projection image data may then be generated by subtracting the mask image data from the corresponding contrast image data.

At 204, reconstruction unit 107 sorts the 3D projection image data into phase-binned image data. In some implementations, the reconstruction unit 107 sorts the 3D projection image data into respective phase-bins according to correlated heart phases provided by the ECG signal data from the ECG monitor 132. Each "phase-bin" includes 3D projection image data corresponding to a particular heart phase of different cycles. Each heart phase is pre-defined at a certain time point of the cardiac cycle and corresponds to an event occurring in the heart. For example, 5 phases corresponding to early diastole, atrial systole, isovolumetric contraction, ventricular ejection and isovolumetric relaxation events may be pre-defined to generate 5 phase-bins.

Figure 3:
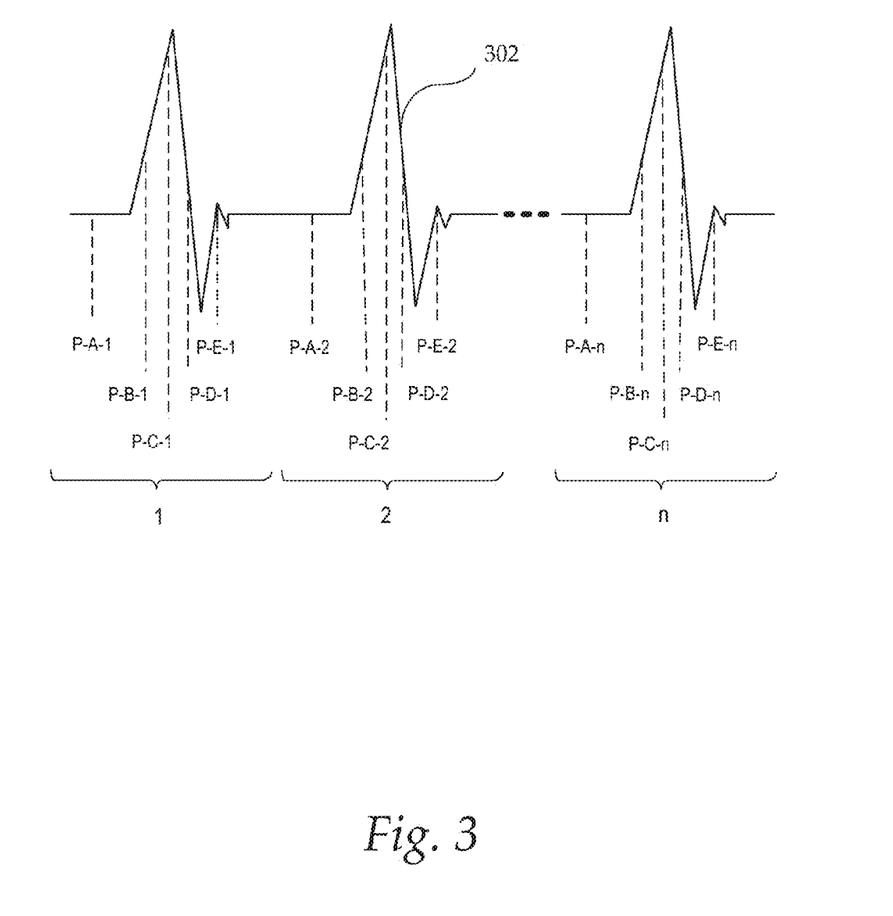
FIG. 3 illustrates an exemplary sorting of projection images according to heart phases.

FIG. 3 illustrates an exemplary sorting of projection images according to heart phases. An exemplary ECG tracing 302 of multiple different cardiac cycles (or heartbeats) (e.g., 1, 2, . . . , n) is shown. The 3D projection images may be sorted into phase-bins corresponding to different phases (e.g., A, B, C, D, E). For example, one phase-bin may contain image data corresponding to phase A (e.g., P-A-1, P-A-2, P-A-3, etc.), another phase-bin may contain image data corresponding to phase B (e.g., P-B-1, P-B-2, P-B-3, etc.), and so forth.

Alternatively, or in combination thereof, the reconstruction unit 107 may sort the 3D projection image data based on a pressure waveform acquired from non-occluded vasculature structures. In some cases, the vascular structures between the aortic valve and the vascular structure of interest (e.g., cerebral vascular structure) acts as a capacitor/damper of the blood flow. This damping can delay and distort the correlation between the heart phases and a projection image. In such case, the projection data associated with non-occluded vascular structures may be used to augment the heart phase monitoring to sort the 3D projection images. Non-occluded vasculature in the projection domain may contain reliable information of the heart pressure waves, where the injection pressure and rate does not overcome the heart pressure wave. Non-occluded vasculature may be described as the sole vessel in the source-detector trajectory. A vascular structure useable for this approach may be, for instance, the internal carotid artery. A contrast/blood mixture pressure waveform (image intensity versus time graph) and the respective position for each projection view may be derived and subsequently used to sort the projection images. The 3D projection images may be sorted according to different phases in the contrast/blood mixture pressure waveform.

Figure 4:
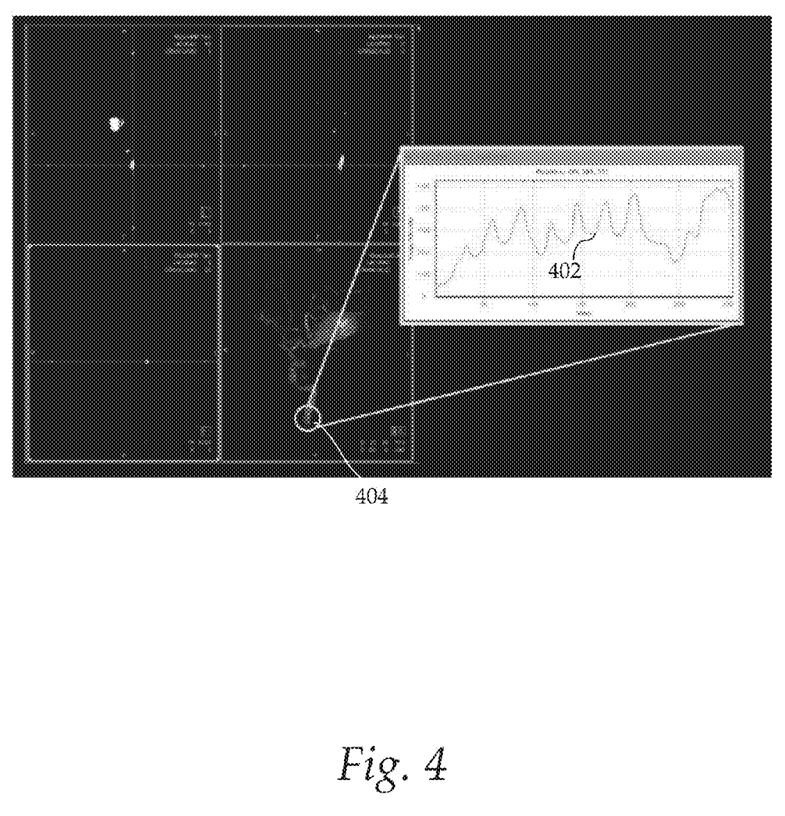
FIG. 4 shows an exemplary representation of pressure waves discernable at the root of the internal carotid artery.

FIG. 4 shows an exemplary representation 402 of contrast/blood mixture pressure waves discernable at the root of the internal carotid artery 404. Such displayed information may be determined by a method referred to as 4D DSA. The 4D DSA method extracts dynamic behavior of the contrast medium in the vessels from the projection image data and the superimposition thereof in a static 3D image of the vascular structure by perspective back projection. See, for example, U.S. Patent Application Publication No. 2014/0094680 A1, which is herein incorporated by reference.

Returning to FIG. 2, at 206, reconstruction unit 107 reconstructs a 3D layout of the aneurysm wall in the vascular structure of interest at different phases using the phase-binned image data. More particularly, a 3D layout of the aneurysm at each phase may be reconstructed using the corresponding bin of sorted projection images. Each 3D layout includes a volume rendering of the aneurysm wall associated with a particular phase 'n'. Various methods may be used to reconstruct the 3D layout by using the phase-binned image data of the aneurysm in the vascular structure of interest as a starting point, as will be discussed in more detail later.

At 208, reconstruction unit 107 determines motion of the aneurysm wall between phases based on the reconstructed 3D layouts. The motion generally refers to the displacement of the aneurysm wall over time. The motion may be derived by performing deformable registration of the 3D layouts at adjacent phases in the cardiac cycle. For example, each 3D layout corresponding to each heart phase may be deformably registered with the 3D layout corresponding to the subsequent adjacent heart phase. Pertinent metrics may then be derived from analyzing the motion. For example, the risk of rupture may be assessed by identifying regions of high stress, deformation and/or mobility in the aneurysm wall. CFD simulations may be performed based on dynamic boundary conditions provided by the determined motion. The simulations may be used to, for example, validate and improve theoretical models that predict aneurysm wall displacement.

Figure 5:
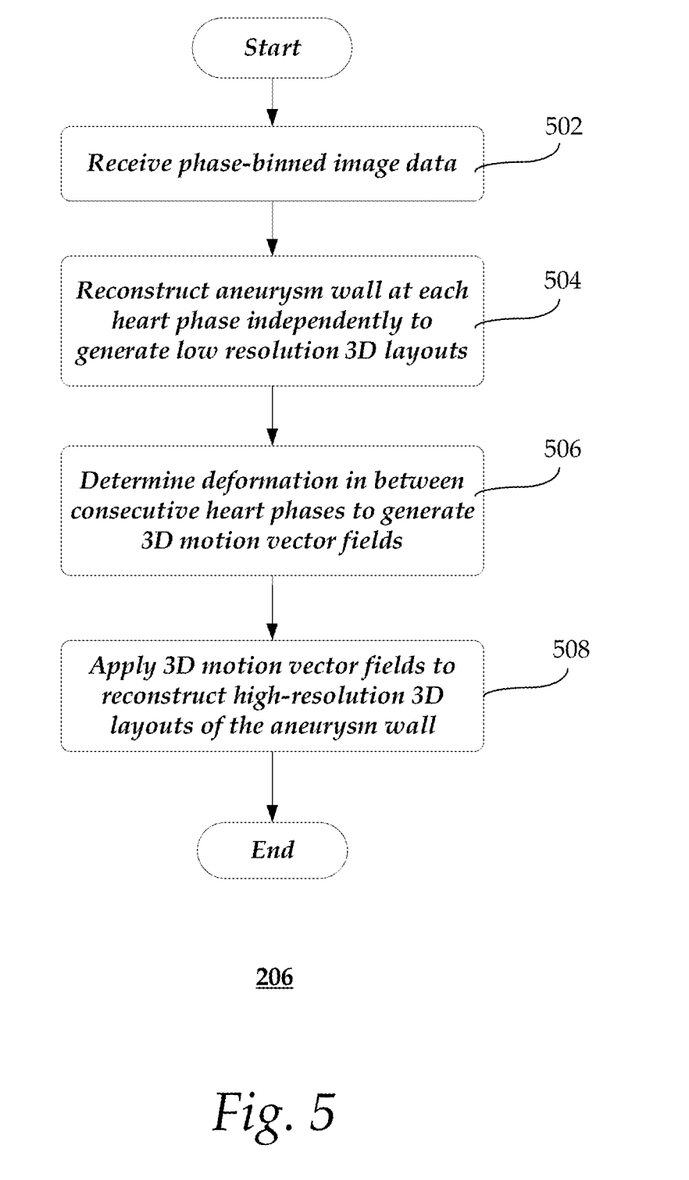
FIG. 5 shows an exemplary method of reconstructing the 3D layout of the aneurysm.

FIG. 5 shows an exemplary method 206 of reconstructing the 3D layout of the aneurysm. It should be understood that the steps of the method 206 may be performed in the order shown or a different order. Additional, different, or fewer steps may also be provided. Further, the method 206 may be implemented with the system 100 of FIG. 1, a different system, or a combination thereof.

At 502, reconstruction unit 107 receives the phase-binned image data of the aneurysm wall in the vascular structure of interest. At 504, reconstruction unit 107 reconstructs the aneurysm wall at each heart phase independently to generate low-resolution 3D layouts corresponding to respective heart phases. This may be performed using, for example, a back-projection algorithm (e.g., filtered backprojection reconstruction).

At 506, reconstruction unit 107 determines deformation of the aneurysm wall between consecutive heart phases to generate 3D motion vector fields. In some implementations, a 3D deformable (or nonrigid) registration method is applied to the low-resolution 3D layouts corresponding to respective heart phases. Each image volume corresponding to each heart phase may be deformably registered with the image volume corresponding to the subsequent heart phase. The deformable registration method establishes correspondences between points in two different image volumes via 3D motion vector fields. Exemplary deformable registration methods include the Demon's algorithm, B-spline method and so forth.

At 508, reconstruction unit 107 applies the 3D motion vector fields to reconstruct high-resolution 3D layouts of the aneurysm wall. In some implementations, the reconstruction is performed for a given heart phase by incorporating the derived vector fields into the filtered backprojection of the phase-binned image data, and actively deforming the path of a backprojected ray to take into account motion of the aneurysm wall. If the projection image volume is not in the given heart phase, the 3D motion vector field pointing from the current heart phase to the given heart phase may be used to deform the backprojection. More particularly, the 3D layouts of the aneurysm wall in other heart phases may be determined in high resolution by applying the respective 3D motion vector fields to the aneurysm wall reconstructed for the given heart phase.

Figure 6:
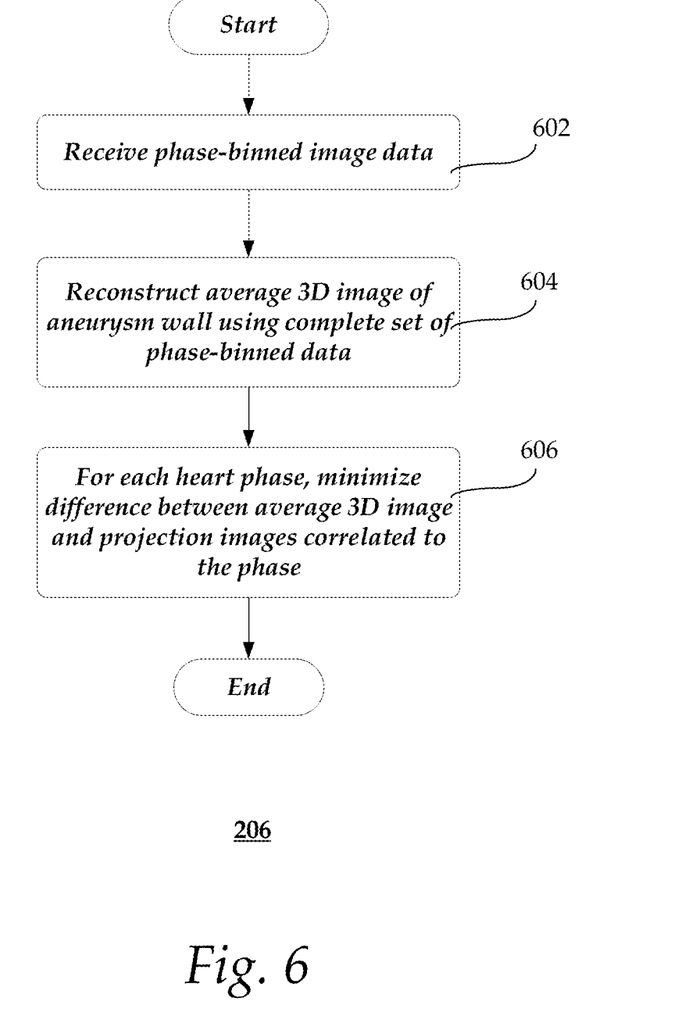
FIG. 6 shows another exemplary method of reconstructing the 3D layout of the aneurysm.

FIG. 6 shows another exemplary method 206 of reconstructing the 3D layout of the aneurysm. It should be understood that the steps of the method 206 may be performed in the order shown or a different order. Additional, different, or fewer steps may also be provided. Further, the method 206 may be implemented with the system 100 of FIG. 1, a different system, or a combination thereof.

At 602, reconstruction unit 107 receives the phase-binned image data of the aneurysm wall in the vascular structure of interest. At 604, reconstruction unit 107 reconstructs an average 3D image of the aneurysm wall by using the complete set of phase-binned data. The average 3D image is a motion blurred volumetric image that represents the average position of the aneurysm wall.

At 606, for each heart phase, the reconstruction unit 107 minimizes the difference between the average 3D image and the bin of projection image data correlated to the specific phase. The minimization may be performed using, for example, algebraic reconstruction, prior image constrained compressed sensing (PICCS), McKinnon-Bates algorithm, or other suitable method. The 3D layouts associated with the corresponding phases may thus be generated.

Figure 7:
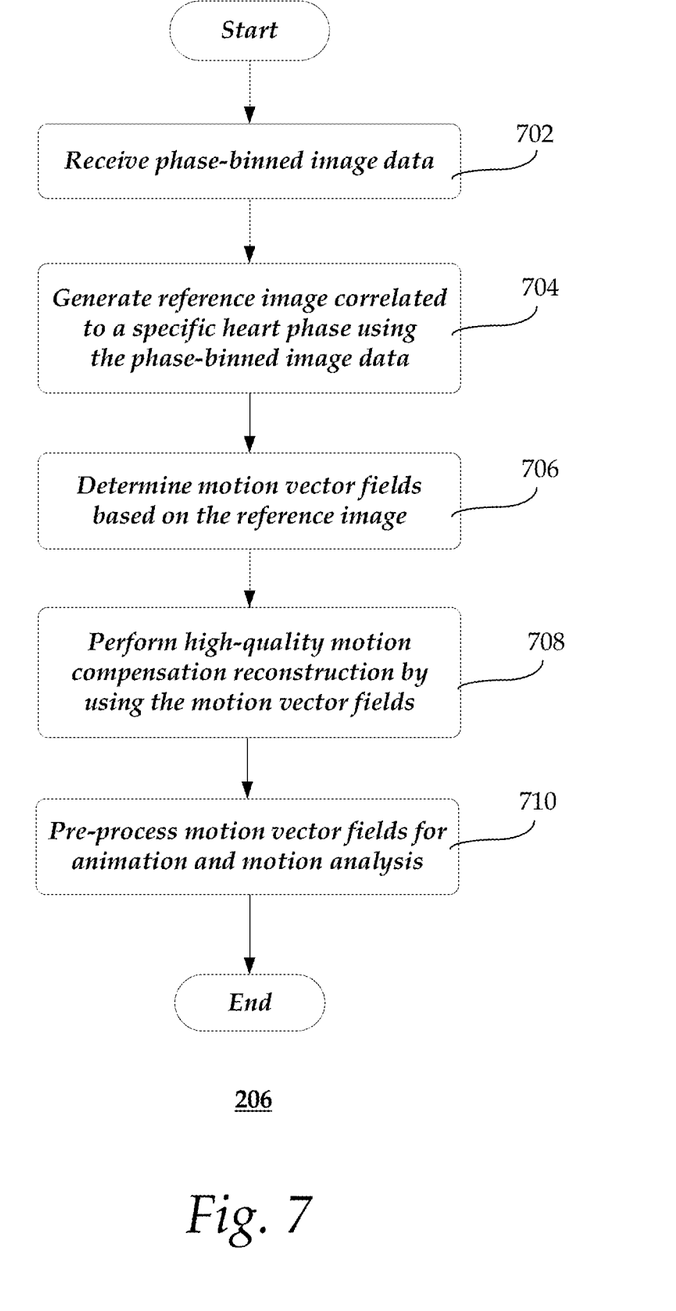
FIG. 7 shows yet another exemplary method of reconstructing the 3D layout of the aneurysm.

FIG. 7 shows yet another exemplary method 206 of reconstructing the 3D layout of the aneurysm. It should be understood that the steps of the method 206 may be performed in the order shown or a different order. Additional, different, or fewer steps may also be provided. Further, the method 206 may be implemented with the system 100 of FIG. 1, a different system, or a combination thereof.

At 702, reconstruction unit 107 receives the phase-binned image data of the aneurysm wall in the vascular structure of interest. At 704, reconstruction unit 107 generates an initial reference image correlated to a specific heart phase using the phase-binned image data. The initial reference image is used for motion estimation. It may be reconstructed by using, for example, a motion-compensated electrocardiogram (ECG)-gating method. See, for example, Rohkohl et al., "ECG-gated interventional cardiac reconstruction for non-periodic motion," Med Image Comput Comput Assist Interv, 2010, 13 (Pt 1):151-8, which is herein incorporated by reference. This reference image may be pre-processed to remove non-vascular structures such that only the vascular structure of interest is visible. The intensity value of a voxel in the reference image corresponds to its likelihood of belonging to a vessel.

At 706, reconstruction unit 107 determines motion vector fields based on the reference image. A motion vector field describes the motion of each voxel in the projection image over time. A motion vector field may be determined for each projection image in the phase-binned image data.

In some implementations, the motion vector fields are determined by using a 3D/3D similarity cost function. See, for example, Rohkohl et al, "Interventional 4D motion estimation and reconstruction of cardiac vasculature without motion periodicity assumption," Med Image Anal, 2010 October, 14(5):687-94 ("Rohkohl"), which is herein incorporated by reference. The technique described by Rohkohl estimates the parameters of the motion model (or motion vector field) by optimizing an objective 3D/3D similarity cost function. The objective cost function aims to maximize the joint intensity of the reference image and the motion compensated Feldkamp, Davis and Kress (FDK) reconstruction.

In other implementations, the motion vector fields are determined by a 2D/2D registration of forward projected images generated from the reference image and the original phase-binned image data. See, for example, Schwemmer et al., "Residual motion compensation in ECG-gated interventional cardiac vasculature reconstruction," Phys Med Biol., 2013 Jun. 7; 58(11):3717-37 ("Schwemmer"), which is herein incorporated by reference. See also, Schwemmer et al., "Opening Windows—Increasing Window Size in Motion-Compensated ECG-gated Cardiac Vasculature Reconstruction," Proceedings of the 12th International Meeting on Fully Three-Dimensional Image Reconstruction in Radiology and Nuclear Medicine (Fully Three-Dimensional Image Reconstruction in Radiology and Nuclear Medicine (Fully 3D)), Lake Tahoe, Calif., USA, 16.-21 Jun. 2013, pp. 50-53, 2013, which is herein incorporated by reference. The technique described by Schwemmer forward projects the reference image using acquisition geometry to generate forward projected image data. The forward projection may be performed using a maximum intensity forward projection. The forward projected images are then registered to pre-processed original phase-binned image data using deformable 2D-2D registration in a multi-resolution scheme to generate 2D motion vector fields.

At 708, reconstruction unit 107 performs a high-quality motion compensation reconstruction by using the motion vector fields to generate the 3D layouts. The motion vector fields are used remove motion-related image artifacts (e.g., blurring or streaks) that may be caused by long acquisition times. The motion vector fields may be applied on all acquired phase-binned image data to reconstruct the 3D layouts of the aneurysm wall.

At 710, reconstruction unit 107 pre-processes the motion vector fields for 4D animation and motion analysis. The motion vector fields used for the reconstruction may not be directly applicable for animation and motion analysis. This may be due to the wrong direction of motion provided and the non-periodicity of cardiac motion. See, for example, Holub et al., "4D motion animation of coronary arteries from rotational angiography," Proc. SPIE 7964, Medical Imaging 2011: Visualization, Image-Guided Procedures, and Modeling, 79641S (2 Mar. 2011), which is herein incorporated by reference. In some implementations, the motion vector fields are inverted and periodized for the purposes of 4D animation and motion analysis.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A system for image-based reconstruction, comprising:
an electrocardiogram monitor that acquires electrocardiogram signal data from a patient; and
a computer system communicatively coupled to the electrocardiogram monitor, wherein the computer system includes
a non-transitory memory device for storing computer readable program code, and
a processor device in communication with the memory device, the processor being operative with the computer readable program code to perform steps including
sorting three-dimensional projection image data of an aneurysm wall in a vascular structure of interest of the patient into phase-binned image data according to phases of the electrocardiogram signal data,
reconstructing, based on the phase-binned image data, three-dimensional layouts of the aneurysm wall in the vascular structure of interest by reconstructing an average three-dimensional image of the aneurysm wall by using the phase-binned image data, and
for at least one of the phases, minimizing a difference between the average three-dimensional image and the phase-binned image data correlated to the phase to generate at least one of the three-dimensional layouts associated with the phase, and
determining motion of the aneurysm wall between the phases based on the reconstructed three-dimensional layouts.

2. The system of claim 1, wherein the electrocardiogram monitor acquires the electrocardiogram signal data during an endovascular intervention performed on the patient.

3. The system of claim 1, wherein the three-dimensional projection image data comprises X-ray delayed Digital Subtraction Angiography image data.

4. The system of claim 1, wherein the phases correspond to early diastole, atrial systole, isovolumetric contraction, ventricular ejection and isovolumetric relaxation events.

5. The system of claim 1, wherein the vascular structure of interest comprises a cerebral vascular structure.

6. A computer-implemented method of image-based reconstruction, comprising:
receiving three-dimensional projection image data of an aneurysm wall in a vascular structure of interest and electrocardiogram signal data, wherein the three-dimensional projection image data is correlated to phases of the electrocardiogram signal data;
sorting, by a processor device, the three-dimensional projection image data into phase-binned image data according to the phases;
reconstructing, by the processor device using the phase-binned image data, three-dimensional layouts of the aneurysm wall in the vascular structure of interest by
reconstructing the aneurysm wall at each of the phases to generate low-resolution three-dimensional layouts,
determining deformation of the aneurysm wall between the phases to generate three-dimensional motion vector fields based on the low-resolution three-dimensional layouts, and
reconstructing high-resolution three-dimensional layouts of the aneurysm wall by applying the three-dimensional motion vector fields in a filtered backprojection of the phase-binned image data; and
determining, by the processor device, motion of the aneurysm wall between the phases based on the reconstructed three-dimensional layouts.

7. The method of claim 6 wherein sorting the three-dimensional projection image data into the phase-binned image data comprises:
sorting the three-dimensional projection image data according to cycles of the electrocardiogram signal data; and
sorting the three-dimensional projection image data associated with each of the cycles according to the phases of the cycle.

8. The method of claim 6 wherein sorting the three-dimensional projection image data into the phase-binned image data comprises sorting the three-dimensional projection image data based on a pressure waveform.

9. The method of claim 8 wherein the pressure waveform is acquired from a root of an internal carotid artery.

10. The method of claim 6 wherein determining motion of the aneurysm wall between the phases comprises performing deformable registration of the three-dimensional layouts.

11. The method of claim 6 further comprising assessing a risk of rupture of the aneurysm wall based on the determined motion.

12. The method of claim 6 wherein determining deformation of the aneurysm wall comprises performing deformable registration based on the phase-binned image data.

13. A non-transitory computer readable medium embodying a program of instructions executable by machine to perform steps for facilitating image-based reconstruction, the steps comprising:
receiving three-dimensional projection image data of an aneurysm wall in a vascular structure of interest and electrocardiogram signal data, wherein the three-dimensional projection image data is correlated to phases of the electrocardiogram signal data;
sorting, by a processor device, the three-dimensional projection image data into phase-binned image data according to the phases;
reconstructing, by the processor device using the phase-binned image data, three-dimensional layouts of the aneurysm wall in the vascular structure of interest by
generating a reference image correlated to one of the phases using the phase-binned image data,
determining motion vector fields based on the reference image, and
reconstructing the three-dimensional layouts of the aneurysm wall by applying the motion vector fields on the phase-binned image data to remove motion-related image artifacts; and
determining, by the processor device, motion of the aneurysm wall between the phases based on the reconstructed three-dimensional layouts.

14. The non-transitory computer readable medium of claim 13 wherein determining motion of the aneurysm wall between the phases comprises performing deformable registration of the three-dimensional layouts.

* * * * *